United States Patent [19]

Hayakawa et al.

[11] Patent Number: 4,924,731

[45] Date of Patent: May 15, 1990

[54] HYDRAULIC CONTROL DEVICE FOR AN AUTOMATIC TRANSMISSION

[75] Inventors: Youichi Hayakawa, Toyoake; Yoshinari Kuwayama, Tokoname; Yoshihiro Yamada, Anjo, all of Japan

[73] Assignee: Aisin Aw. Co., Ltd., Anjo, Japan

[21] Appl. No.: 293,266

[22] Filed: Jan. 4, 1989

[30] Foreign Application Priority Data

Aug. 31, 1988 [JP] Japan .................................. 63-217952

[51] Int. Cl.$^5$ ............................................. B60K 41/06
[52] U.S. Cl. .......................................... 74/869; 74/867
[58] Field of Search .................. 74/860, 861, 867, 868, 74/869

[56] References Cited

U.S. PATENT DOCUMENTS 3,937,108  2/1976  Will .................................... 74/869 X
4,274,308  6/1981  Iwanaga et al. .................. 74/868 X Primary Examiner—Dwight G. Diehl
Assistant Examiner—Khoi Q. Ta
Attorney, Agent, or Firm—Kanesaka and Takeuchi

[57] ABSTRACT

An orifice is installed on an oil passage to a hydraulic servo for a direct clutch. In forward high speed running, a line pressure from the D range port of a manual valve is supplied to the hydraulic servo through an oil passage used for forward high speed running and a three way cock (non manual type). Then comparatively large amount of oil is supplied to the servo in accordance with the high speed running. In reverse running, the line pressure from the R range port of the manual valve is supplied to the servo through the orifice and the three way cock. Consequently, comparatively small amount of oil is supplied to the hydraulic servo.

5 Claims, 5 Drawing Sheets

FIG. 4

| POSITION | | SOLENOID | | | CLUTCH | | | BRAKE | | | | O.W.C | | |
|---|---|---|---|---|---|---|---|---|---|---|---|---|---|---|
| | | S1 | S2 | S4 | C1 | C2 | C3 | B1 | B2 | B3 | B4 | F1 | F2 | F3 |
| P | | × | ○ | | | | | | | | ○ | | | |
| R | V≦7 | × | ○ | | | ○ | | | | ○ | ○ | | | |
| | V>7 | ○ | ○ | | | ○ | | | | × | ○ | | | |
| N | | × | ○ | | | | | | | | ○ | | | |
| D | 1ST | × | ○ | | ○ | | | | | | ○ | | ○ | ○ |
| | 2ND | ○ | ○ | ◎ | ○ | | | ○ | ○ | | ○ | ○ | | ○ |
| | 3RD | ○ | × | ◎ | ○ | ○ | ○ | ○ | | | | ○ | | |
| | 4TH | × | × | ◎ | ○ | ○ | ○ | | ○ | | | | | |
| 3 | 1ST | × | ○ | | ○ | | | | | | ○ | | ○ | ○ |
| | 2ND | ○ | ○ | ◎ | ○ | | | ○ | ○ | | ○ | ○ | | ○ |
| | 3RD | ○ | × | ◎ | ○ | ○ | ○ | ○ | | | | ○ | | |
| | (3RD) | × | × | | ○ | ○ | ○ | ○ | | | | ○ | | |
| 2 | 1ST | × | ○ | | ○ | | | | | | ○ | | ○ | ○ |
| | 2ND | ○ | ○ | | ○ | | | ○ | ○ | | ○ | ○ | | ○ |
| | (3RD) | ○ | × | | ○ | | ○ | ○ | ○ | | | ○ | | |
| | (3RD) | × | × | | ○ | | ○ | ○ | ○ | | | ○ | | |
| 1 | 1ST | × | ○ | | ○ | | | | | ○ | ○ | | ○ | ○ |
| | 2ND | ○ | ○ | | ○ | | | ○ | ○ | ○ | ○ | ○ | | ○ |
| | (1ST) | × | × | | ○ | | | | | ○ | ○ | | ○ | ○ |

| REMARKS | | |
|---|---|---|
| ○ | ON | APPLIED |
| × | OFF | RELEASE |
| ◎ | ON: L-UP ON  OFF: L-UP OFF | |

HYDRAULIC CONTROL DEVICE FOR AN AUTOMATIC TRANSMISSION

BACKGROUND OF THE INVENTION

1. FIELD OF THE INVENTION

The present invention relates to a hydraulic control device for an automatic transmission, in particular to an oil passage structure to a clutch hydraulic servo which engages at reverse running and at forward high speed running.

2. DESCRIPTION OF THE PRIOR ART

Generally in a four speed automatic transmission constituted by a three speed automatic transmission mechanism and an under drive (or over drive) mechanism, a clutch which is engaged at reverse running (for example, a direct clutch) is also used in high speed running at D range (for example, a fourth speed at D range). A line pressure is applied to the clutch hydraulic servo by the same oil passage at both reverse running and forward high speed running.

However, the clutch hydraulic servo is under the high speed rotation when in forward high speed running, while the servo is under low speed rotation in reverse running, wherein the line pressure is invariably the same and is supplied through the same oil passage and the same orifice. Accordingly, if the orifice is designed for the forward high speed running in reverse running, hydraulic pressure is excessively applied to the hydraulic servo which is under low speed rotation, so that a shift shock may occur. On the other hand if the orifice is designed for the reverse running, in forward high speed running, hydraulic pressure is short due to leakage from a seal ring and a check ball for centrifugal hydraulic pressure release, so that the engaging time of the clutch becomes long, and further burning of the clutch plates may occur.

SUMMARY OF THE INVENTION

The present invention is purposed to provide, with the due consideration to the drawbacks of such conventional devices, a hydraulic control device for an automatic transmission, having do respective oil passages for the forward high speed running and the reverse running, and an orifice is installed on the oil passage for the reverse running.

In the present invention, as shown in FIG. 1, in a hydraulic control device for an automatic transmission, including a plurality of hydraulic servos with a hydraulic servo (C2) for frictional engaging elements to connect or restrain certain elements of a shift gear mechanism; a plurality of shift valves (9), (10) to control hydraulic pressure working on the plurality of hydraulic servos; and a manual valve (7), the hydraulic servo (C2) for a clutch engaging at reverse running and at forward high speed running is connected to an oil passage used at forward high speed running (Da), which applies hydraulic pressure from a D range port of the manual valve (7) through certain shift valves (9), (10), and an oil passage used at reverse running (Ra), which applies hydraulic pressure from a reverse range of the manual valve (7) to the hydraulic servo (C2) for the clutch, and the oil passage (Ra) used under reverse running has certain orifice (5) situated in the oil passage (Ra).

Based on the above structure, when the automatic transmission is under high speed running (for example fourth speed) at the D range, the line pressure supplied from the D range port (D) of the manual valve (7) is supplied to a port (Dc) of a shift valve (9) through an oil passage (Db). Based on a lower-half position of the first shift valve (9), the line pressure is supplied to a port (Dg) of the second shift valve (10) through a port (De), (Df) from a port (Dd). Furthermore, based on an upper-half position of the shift valve (10), the line pressure is supplied to a regulating valve (80) from a port (Dh) through the oil passage (Da), a three way cock (6) and an oil passage (6a). Hydraulic pressure regulated down to certain pressure by the regulating valve and an accumulator (81) is supplied to the clutch hydraulic servo (C2) which is under the high speed rotation through oil passages (6b), (6c).

On the other hand, when the automatic transmission is at reverse running, the line pressure supplied from a reverse range port (R) of the manual valve (7) is supplied to the regulating valve (80) through the oil passage (Ra) for reverse running, the three way cock (6) and the oil passage (6a). Further, the hydraulic pressure which is regulated to certain pressure by the regulating valve (80) and the accumulator (81) is supplied to the clutch hydraulic servo (C2) through the oil passages (6d), (6c).

Under such circumstances, the line pressure is regulated by the orifice (5) in accordance with the low speed rotation of the hydraulic servo (C2) at reverse running.

Incidentally, the reference numerals in the parentheses are used only for reference with the drawings and do not limit the invention. The same number may be named differently in the following description with respect to the previous description in which broader concepts are adopted.

BRIEF DESCRIPTION OF THE DRAWINGS

In the drawings:

FIG. 4 is a table of operation of the automatic transmission.

DETAILED DESCRIPTION OF THE PREFERRED EMBODIMENTS

The present invention will now be explained along with the drawings.

Figure 2:
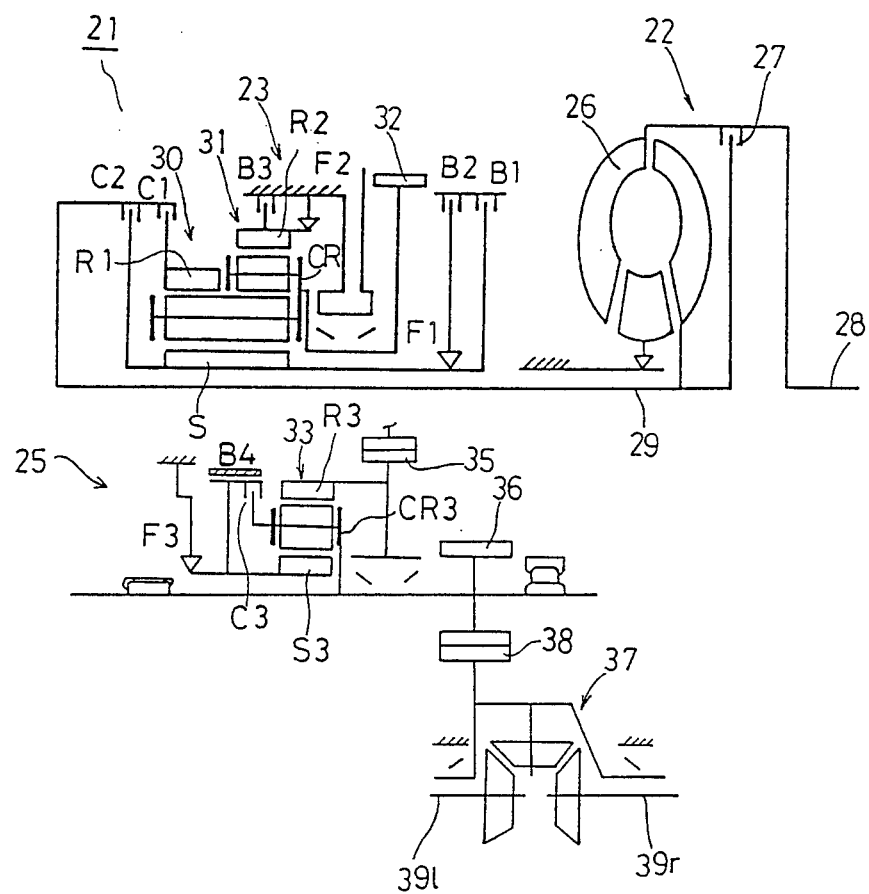
FIG. 2 is a schematic illustration of an automatic transmission suitable for the present invention.

Now referring to FIG. 2, an automatic transmission 21 includes a three speeds automatic transmission mechanism 23, a torque converter section 22, and an under drive mechanism 25.

The torque converter section 22 has a torque converter 26 and a lock-up clutch 27, whereby rotation of an engine crank shaft 28 is transmitted to an input shaft 29 through the torque converter 26 hydraulically, or through a mechanical connection of the lock-up clutch 27.

The three speed automatic transmission mechanism 23 has a planetary gear unit composed of a single planetary gear 30 and a dual planetary gear 31. In the planetary gear unit, the sun gears of the two planetary gears are integrally linked. The input shaft 29 and a ring gear R1 of the single planetary gear 30 are connected through a first (forward) clutch C1. The input shaft 29 and a sun gear S are connected through a second (direct) clutch C2. The sun gear S is restrained directly by a first (2nd coast) brake B1 and is restrained in one-way rotation by a second (2nd) brake B2 through a first one-way clutch F1. A ring gear R2 of the dual planetary gear 31 is restrained directly by a third (1st coast & reverse) brake B3 and is restrained in one-way rotation by a second one-way clutch F2. The carrier CR1 is connected to a counter drive gear 32 which is an output member for the three speed automatic transmission mechanism 23.

The under drive mechanism 25 has a single planetary gear 33, whose ring gear R3 is connected to a counter driven gear 35 which invariably meshes with the counter drive gear 32, and a carrier CR3 is connected to an output pinion 36. Further the sun gear S3 is restrained directly by a fourth (under drive) brake B4 and is restrained by a one-way clutch F3. And the sun gear S3 is connected to a carrier CR3 through a third (under drive direct) clutch C3.

The output pinion 36 is connected to a front differential device 37 through a ring gear 38, and the differential device 37 has left and right front axle shafts 39l, 39r.

Figure 3:
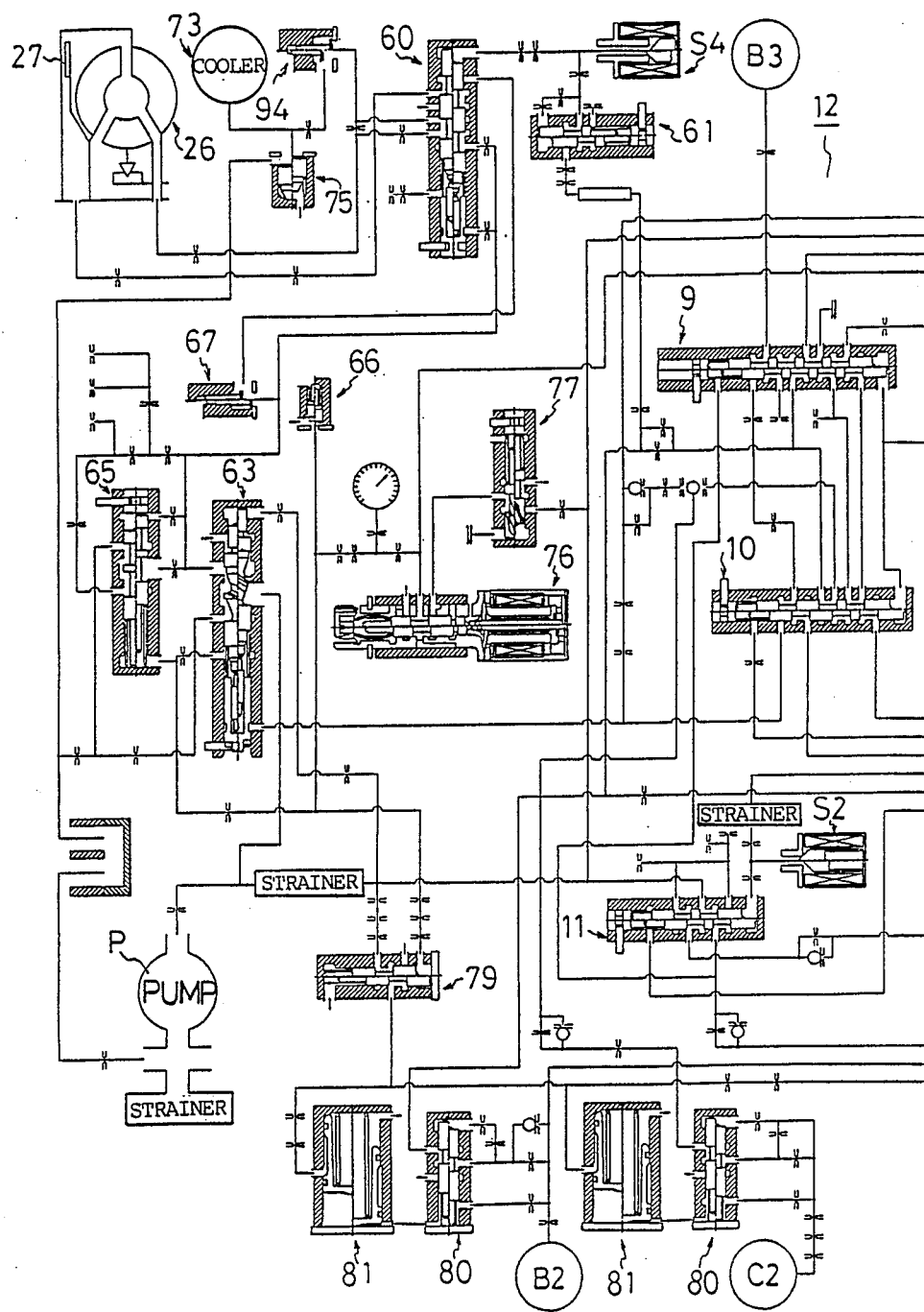
FIG. 3 is a hydraulic circuit diagram of the automatic transmission.
Figure 3:
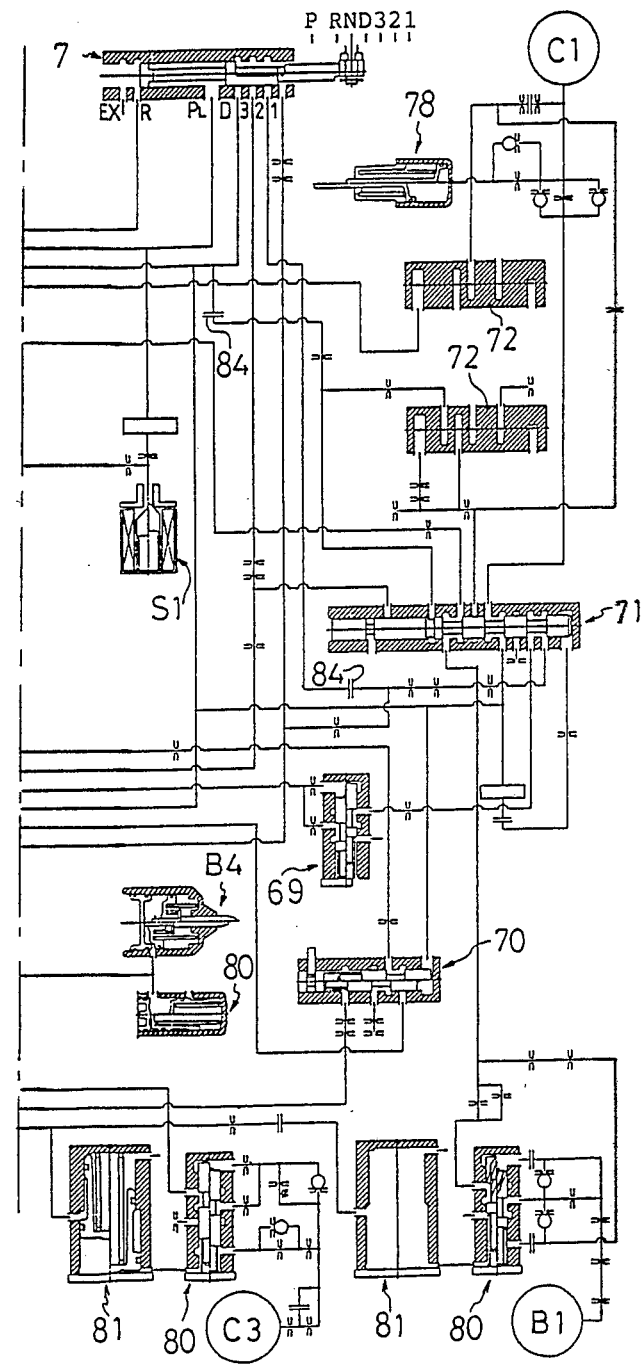

And the four speed automatic transmission 21, as shown in FIG. 3, is controlled by a hydraulic circuit 12.

In the circuit 12, C1, C2, C3 are hydraulic servos for the clutches $C_1$, $C_2$, $C_3$, while B1, B2, B3, B4 are hydraulic servos for the brakes $B_1$, $B_2$, $B_3$, $B_4$. 7 is a manual valve, 9 is a 1-2 shift valve composing a first shift valve, 10 is a 3-4 shift valve composing a second shift valve, and 11 is a 2-3 shift valve composing a third shift valve. S1 is a first solenoid valve controlling the 1-2 shift valve 9 and the 3-4 shift valve 10. S2 is a second solenoid valve controlling the 2-3 shift valve 11. Moreover, as shown in FIG. 3, 60 is a lock-up control valve, S4 is a fourth solenoid valve to duty-control the lock-up control valve 60, and 61 is a lock-up modulator valve to stabilize the duty-control of the solenoid valve. 63 is a primary regulator valve, 65 is a secondary regulator valve, 66 is a pressure relief valve, 67 is a check valve for the lock-up control valve 60, and 69 is a low modulator valve. 70 is a B1 sequence valve to control the operation of the first (2nd coast) brake. 71 is a 4-5 shift valve to use for a forward five speed automatic transmission, 72 is a plug for a valve of the above five speeds automatic transmission. (for example, C1 modulator valve, 2nd modulator valve) In this embodiment, a spool of the 4-5 shift valve 71 is fixed on the position shown in FIG. 3. (refer to the Japanese Laid Open Patent No. Sho-63-106447 with reference to the operation of a neutral control valve, a C1 modulator valve and 2nd modulator valve) Furthermore 73 is an oil cooler, 75 is a cooler bypass valve, 76 is a throttle valve composed of a linear solenoid valve, which is capable of controlling hydraulic pressure freely, and 77 is a solenoid modulator valve. 79 is an accumulator control valve. 94 is a check valve, 26 is the torque converter, 27 is the lock-up clutch, and P is an oil pump. And to each of the second clutch hydraulic servo C2, the third clutch hydraulic servo C3 and the second brake hydraulic servo B2, a regulating valve 80 and an accumulator 81 are connected. On the other hand, a regulating valve 78 is connected to the first clutch hydraulic servo C1. Incidentally, a regulating valve for the first brake hydraulic servo is a type that supplied pressure works as a spool regulating pressure, and the accumulator 81 whose inside is empty.

Incidentally, a symbol 84 like a condenser mark is a separator plate blocking oil passages. Due to this configuration the hydraulic circuit for the four speed automatic transmission is capable of being used as a valve body for a five speed automatic transmission.

Figure 1:
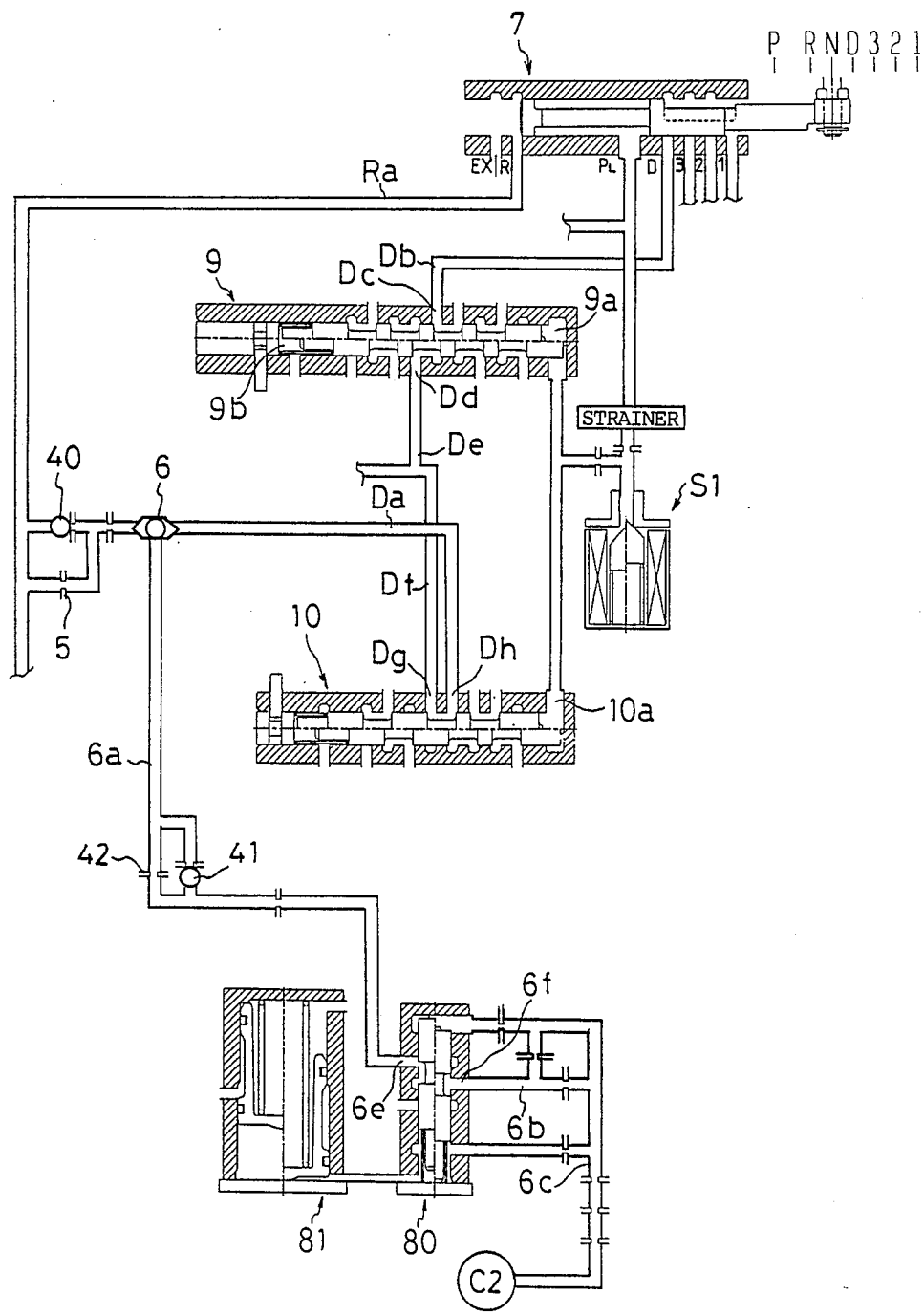
FIG. 1 is a cross sectional view of an important part of a hydraulic control device of the present invention.

As shown in FIG. 1, an oil passage Da which is connected to a port Dh of the 3-4 shift valve 10, and an oil passage Ra which is connected to a reverse range R of the manual valve 7 are connected to input ports of a three way cock (non manual type) 6. On the passage Ra, an orifice 5 and a check valve 40 are installed. The line pressure is regulated to suitable oil amount in accordance with low speed rotation of the second clutch hydraulic servo C2 in reverse running. While an oil passage Db is laid between the D range port of the manual valve 7 and a port Dc of the 3-4 shift valve 10. Oil passages De and Df are laid between a port Dd of the 1-2 shift valve 9 and a port Dg of the 3-4 shift valve 10. Oil passages 6b and 6c are laid between the second (direct) clutch hydraulic servo C2 and a port 6f of the regulating valve 80. On the other hand, an accumulator 81 is connected to the regulating valve 80, so that the line pressure supplied from the oil passage 6a is regulated to certain pressure.

The operation of the embodiment shall be now explained.

With regard to the four speed automatic transmission 21, by shifting the manual valve 7 to each range, the first and the second solenoid valves S1, S2, and the fourth solenoid valve S4 are operated as shown in FIG. 4. Based on the motions of the solenoid valves, the clutches C1, C2 and C3, the brakes B1, B2, B3 and B4, the one-way clutches F1, F2 and F3 operate, so that shifting speed from 1st to 4th are obtained at each range P, R, D, 3, 2, 1 of the manual valve.

Namely, a first speed mode of D range: the first solenoid valve S1 is OFF which means a supply condition, and the second solenoid valve S2 is ON which means a drain condition. Accordingly the 1-2 shift valve 9 and the 3-4 shift valve 10 are in a upper-half position, and the 2-3 shift valve 11 is in a lower-half position. Under this condition, the line pressure from the port D of the manual valve 7 is supplied to the first clutch hydraulic servo C1, while the line pressure is applied to the fourth brake hydraulic servo B4. Because of the above motions, the first (forward) clutch $C_1$ is engaged and the fourth brake B4 operates. As a result, rotation of the input shaft 29 is transmitted to the ring gear R1 through the clutch $C_1$, and the ring gear R2 is stopped by the second one-way clutch F2, so the sun gear S idles reversely, the common carrier CR1 rotates in normal rotative direction with greatly reduced speed, and such reduced rotation is taken out from the counter drive gear 32 and transmitted to the counter driven gear 35 of the under drive (U/D) mechanism 25. The under drive mechanism 25 is under an under drive condition in which the fourth brake B4 and the third one-way clutch F3 operate. Consequently, in the automatic transmission 21 as a whole, a first speed mode is obtained by the combination of a first speed of the three speed automatic transmission mechanism 23 and the under drive condition of the under drive mechanism 25.

At a second speed mode of D range: from the first speed mode, the solenoid valve S1 is ON and drained. Then the 1-2 shift valve 9 and the 3-4 shift valve 10 are switched to the lower half position. The line pressure from the port D is supplied to the second brake hydraulic servo B2. Furthermore after hydraulic pressure is supplied to the servo B2, the B1 sequence valve 70 is switched to the upper-half position based on the servo B2, the first brake hydraulic servo B1 is supplied with hydraulic pressure. Accordingly, under this condition, the second brake B2 operates in addition to the first clutch C1. Then the sun gear S is stopped by the operation of the first one way clutch F1 based on the second brake B2, the rotation of the input shaft 29 is transmitted to the ring gear R1, and the ring gear R1 idles the ring gear R2 in normal direction and rotates the carrier CR1 in normal rotating direction with reduced speed. Such reduced rotation is taken out from the counter drive gear 32 and transmitted to the counter driven gear 35 of the under drive mechanism 25. The under drive mechanism 25 is under the under drive condition, and accordingly in the automatic transmission 21 as a whole, the second speed mode is obtained by the combination of the second speed condition of the three speed automatic transmission mechanism 23 and the under drive condition of the under drive mechanism 25. Incidentally after the up shifting from the second speed to the third speed is completed, the first brake B1 is engaged, so that it is possible to apply the engine brake when coasting.

At a third speed mode of D range: from the second speed mode, the second solenoid valve S2 is switched to OFF (supply condition). Then the 2-3 shift valve 11 is switched to the upper-half position. The line pressure is applied to a back control chamber of the 1-2 shift valve 9, and the third clutch hydraulic servo C3 through the 2-3 shift valve 11, and at the same time, the fourth brake hydraulic servo B4 is drained. Due to this motion, the three speed automatic transmission 23 remains under the second speed condition, and the under drive mechanism 25 is under the direct connecting condition by the release of the fourth brake B4 and the engagement of the third clutch C3. Accordingly, in the automatic transmission 21 as a whole, the third speed mode is obtained by the combination of the second speed condition of the automatic transmission mechanism 23 and the direct connecting condition of the under drive mechanism 25.

At a fourth (4th) speed mode of D range: from the third speed mode, the first solenoid valve S1 is switched to OFF (supply) condition. Then as shown in FIG. 1 in detail, a control pressure is supplied to a front (right) control chamber $10a$ of the 3-4 shift valve 10, so that the valve 10 is switched to the upper-half position. And, the control pressure is applied to a front (right) control chamber $9a$ of the 1-2 shift valve 9. However, the line pressure is supplied to a back (left) control chamber $9b$, so that the valve 9 is kept under the lower half position by the combination of the line pressure in the chamber $9b$ and the spring pressing force. Accordingly, the line pressure from the port D is supplied to the port Dg of the 3-4 shift valve 10 through the oil passage Db, the ports Dc, Dd of the 1-2 shift valve 9, and the oil passages De, Df. Furthermore, the line pressure is supplied to the port $6e$ of the regulating valve 80 through the port Dh, the oil passage Da, the three way cock 6 and the oil passage $6a$. And the line pressure is supplied to the second clutch hydraulic servo C2 from the port $6f$ through the oil passages $6b$ and $6c$. Due to this, the first (forward) clutch $C_1$ and the third clutch $C_3$ are engaged, and the second brake $B_2$ operates, and in addition, the second clutch $C_2$ is engaged. Then, the rotation of the input shaft 29 is transmitted to the ring gear R1 through the first clutch $C_1$, and at the same time, transmitted to the sun gear S through the second clutch $C_2$. Accordingly each element of the planetary gear unit rotates together, and the same rotative speed as the input shaft is taken out from the carrier CR1. The rotation of the counter drive gear 32 is coupled to the direct connecting condition of the under drive mechanism 25, and then the fourth speed which is the same rotation speed as the input shaft 29 is taken out from the pinion 36. In the automatic transmission 21 as a whole, the over-drive rotation is obtained based on the gear ratio of the pinion 36 and the ring gear 38. At this stage, the second clutch hydraulic servo C2 is under high speed rotation. However, the line pressure supplied from the oil passage $6a$ is supplied quickly to the servo C2 because the oil passage $6a$ has only one orifice 42, which means large amount of oil is supplied quickly.

When the manual valve 7 is operated from the neutral (N) range to the reverse (R) range, the line pressure of the line pressure port $P_L$ is supplied to the oil passage Ra through the port R. The line pressure in the passage Ra is supplied to the port $6e$ of the regulating valve 80 through the three way cock 6 (non manual type), and the oil passage $6a$. The line pressure is supplied to the second clutch hydraulic servo C2 from the port $6f$ through the oil passages $6b$ and $6c$. At the shifting from the N range to the R range, when the vehicle is parking or running at slow speed (below 7 km/h), the first solenoid valve S1 is OFF (supply condition). Accordingly the 1-2 shift valve 9 and the 3-4 shift valve 10 are under the upper-half position, the line pressure in the oil passage Ra is led to the 3-4 shift valve 10, and further led to the 1-2 shift valve 9, and from the valve 9 the line pressure is led to the third brake hydraulic servo B3. Due to this, in the automatic transmission 21, the second clutch $C_2$ is engaged and the third brake $B_3$ operates. Then the rotation of the input shaft 29 is transmitted to the sun gear S through the second clutch $C_2$, and under this condition, the ring gear R1 rotates reversely because the ring gear R2 is stopped by the third brake $B_3$. and the carrier CR1 rotates reversely, wherein the rotation of the carrier is transmitted from the counter drive gear 32 to the under drive mechanism 25.

When shifting from the N range to the R range, in case that the vehicle runs at more than certain speed (7 km/h), based on the signals from a vehicle speed sensor to the control unit (not shown), the control unit sends signals to the first solenoid valve S1. Then the first solenoid valve is switched to drain, so that the 1-2 shift valve 9 and the 3-4 shift valve 10 are switched to the lower-half position. By this the third brake hydraulic servo B3 is not supplied with the line pressure and is drained. Accordingly the third brake $B_3$ is released, and as a result, shifting to R range when running is prevented.

Under the reverse running condition, the second clutch hydraulic servo C2 is under the low speed rotation, and the line pressure in the oil passages Ra and $6a$ which is supplied to the servo C2 is regulated in accordance with the low speed rotation by the orifice 5, so that excessive supply of the line pressure is securely prevented, and shift shock when shifting from the N range to the R range is also securely prevented.

When the manual valve 7 is switched to the 3 range by the operation of the shift lever or the operation of switch, the line pressure in the line pressure port $P_L$ is connected to the 3 range port in addition to the D range port. At the 3 range, the first, the second and the third speed modes are the same as those of the D range. Incidentally, when the both solenoid valves S1, S2 are off, the third speed mode is maintained.

And, when the manual valve 7 is switched to the 2 range, the line pressure from the line pressure port $P_L$ is applied to the D range port D, the 3 range port 3 and the 2 range port 2. At the 2 range, the first speed mode and the second speed mode are the same as those of the 3 range.

When the manual valve 7 is switched to the 1 range, the line pressure from the line pressure port $P_L$ is applied to the D range port D, the 3 range port 3, the 2 range port 2 and the 1 range port 1. At the 1 range, in the first speed mode, the first solenoid valve S1 is OFF (supply condition) and the second solenoid valve S2 is ON (drain condition), as same as the first speed mode of the 2 range. Because of this, the third brake $B_3$ operates from the first speed mode of the 1 range. Incidentally, the second speed mode of the 1 range is the same as that of the 2 range.

The above explanation is stated along with the embodiment of the automatic transmission which the applicant of the present invention has proposed in the Japanese Laid Open Patent No Sho-62-93546. However it is also applicable to conventional Simpson type and Ravigneaux type automatic transmissions.

TECHNICAL ADVANTAGES OF THE INVENTION

As explained, the oil passage used for reverse running (Ra) and the oil passage used for forward high speed running (Da) are respectively connected to the clutch hydraulic servo (C2) which is engaged in reverse running and forward high speed running, and the orifice (5) is installed on the oil passage used for reverse running. Because of the above arrangement, when the servo (C2) is under low speed rotation of reverse running, the line pressure is suitably regulated by the orifice (5) in accordance with the low speed rotation of reverse running, so that the shift shock when the clutch is engaged due to excessive oil supply is securely prevented by means of simple device such as ah orifice.

On the other hand, when the hydraulic servo (C2) is under high speed rotation of forward high speed running, oil from line pressure is supplied to the servo (C2) through the oil passage (Da) without having a throttle such as an orifice. Since sufficient amount of oil from line pressure is supplied to the servo (C2), in case a check ball is installed in the servo (C2) to drain hydraulic pressure therein, oil does not leak from the servo (C2). Also, clutch engaging time is suitably set, and further burning of clutch plates caused by short supply of oil is securely prevented.

What is claimed is:

1. A hydraulic control device for an automatic transmission, comprising:
   a shift gear mechanism having frictional engaging elements,
   a plurality of hydraulic servos for the frictional engaging elements, said hydraulic servos controlling the frictional engaging elements and including a first hydraulic servo with a first oil passage operating at reverse running and forward high speed running,
   a plurality of shift valves for controlling oil pressure working on said hydraulic servos,
   a manual valve having a D range port and a reverse range port,
   a second oil passage for the forward high speed running, said second oil passage communicating to the first hydraulic servo from the D range port of the manual valve through the shift valves,
   a third oil passage for the reverse running, said third oil passage communicating to the first hydraulic servo from the reverse range port of the manual valve,
   an orifice formed at the third oil passage,
   a three-way cock connected to the first, second and third oil passages, said three-way cock supplying oil to the first hydraulic servo from one of the second and third oil passages, and
   an accumulator communicating with the first oil passage situated between the three-way cock and first hydraulic servo.

2. A hydraulic control device according to claim 1 further comprising a check valve situated in the third oil passage parallel to the orifice, said check valve allowing drainage of hydraulic pressure from the first hydraulic servo.

3. A hydraulic control device according to claim 1, further comprising a regulating valve formed at the first oil passage communicating with the first hydraulic servo.

4. A hydraulic control device according to claim 1, wherein said shift valves situated between the second oil passage and the D range port of the manual valve are a 1-2 shift valve shifting between a forward first speed and a forward second speed, and a 3-4 shaft valve shifting between a forward third speed and a forward fourth speed.

5. A hydraulic control device according to claim 4, wherein at the forward high speed running, oil pressure from the D range port of the manual valve is supplied to the first hydraulic servo through the 1-2 shift valve and 3-4 shift valve.

* * * * *